United States Patent
Komori

(10) Patent No.: US 6,490,663 B1
(45) Date of Patent: Dec. 3, 2002

(54) ELECTRONIC CONTROL APPARATUS HAVING REWRITABLE NONVOLATILE MEMORY

(75) Inventor: Hirokazu Komori, Okazaki (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 09/329,239

(22) Filed: Jun. 10, 1999

(30) Foreign Application Priority Data

Jul. 14, 1998 (JP) .............................................. 10-198253

(51) Int. Cl.[7] .............................................. G06F 12/00
(52) U.S. Cl. .............................. 711/153; 711/102; 713/1
(58) Field of Search ................................ 711/103, 102, 711/124, 153, 173; 713/1, 2

(56) References Cited

U.S. PATENT DOCUMENTS 5,022,077 A * 6/1991 Bealkowski et al. ....... 340/5.74
5,379,342 A * 1/1995 Arnold et al. ................. 380/2
5,701,492 A * 12/1997 Wadsworth et al. ......... 395/712
5,838,614 A * 11/1998 Estakhri et al. ......... 365/185.11
5,892,942 A * 4/1999 Ohnishi et al. ................ 713/1

FOREIGN PATENT DOCUMENTS

JP 7-311603 11/1995
JP 09-128229 5/1997

* cited by examiner

*Primary Examiner*—Matthew Kim
*Assistant Examiner*—Matthew D. Anderson
(74) *Attorney, Agent, or Firm*—Nixon & Vanderhye P.C.

(57) ABSTRACT

In a memory rewriting apparatus, it is confirmed first that a check program is present at a head address of a storage area in a flash ROM of a microcomputer in an ECU for storing an application program, when it is determined by a boot program in the flash ROM that the application program is to be executed. The processing proceeds to the application program after the execution of the check program. Thus, it will not occur that the processing jumps to the application program when the application program is not present. As a result, erroneous operation of the ECU due to an erroneous execution of the program can be prevented.

13 Claims, 3 Drawing Sheets

ELECTRONIC CONTROL APPARATUS HAVING REWRITABLE NONVOLATILE MEMORY

CROSS REFERENCE TO RELATED APPLICATION

This application relates to and incorporates herein by reference Japanese Patent Application No. 10-198253 filed on Jul. 14, 1998.

BACKGROUND OF THE INVENTION

1. Field of the Invention

The present invention relates to an electronic control apparatus, which has a function of control based on an application program stored in a rewritable nonvolatile memory and a function of rewriting the application program.

2. Description of Related Art

An electronic control apparatus conventionally has a rewritable nonvolatile memory such as a flash ROM, which stores a control program for controlling a predetermined control object such as an internal combustion engine. It is known that the electronic control apparatus executes a predetermined control by jumping to the control program when a request of rewriting the control program stored in the rewritable nonvolatile memory is issued.

If the control program has not been written into the rewritable nonvolatile memory or has been written incompletely only partly in the electronic control apparatus for some reason, such an incomplete operation occurs that the control object can not be controlled normally even when the electronic control apparatus executes the control program. This problem may be countered by providing data, which indicate whether the control program is written, in a specified address in the rewritable nonvolatile memory, and waiting for a rewriting request in a boot program (starting program) stored in the rewritable nonvolatile memory along with the control program when it is determined with the data that the control program has not been written.

It is only required in the above apparatus that the data indicative of the presence/absence of the control program is provided in the specified address to determine the presence/absence of the control program for controlling the predetermined control object, and that the boot program is required to check the data in that address. The control program, however, is required to have its own data to indicate its own presence/absence. This disables changing an address construction.

That is, in the conventional determination of the presence and absence of an application program, the presence/absence of the application program is determined by providing 00h as the specific data at the specified address of the application program, for instance at the last of the application program, and by reading the data in that address by the boot program and determining whether it is 00h. Here, h of 00h denotes the hexadecimal number (in hexadecimal notation), and 00h (hexadecimal notation) indicates 0 (decimal notation) in which all 8 bits (1 byte) are 0.

Thus, when the application program is altered to cause a change in its size, the address for the data which indicates the presence/absence of the application program also changes. As a result, the boot program is also required to be changed. Further, when the program in other storage areas has been altered in part erroneously although the data which indicates the presence/absence of the application program indicates the presence of data, the program runs erroneously and causes erroneous operation when the processing jumps to the application program.

Therefore, processing may be held in an endless wait condition (e.g., for a rewriting command) by an erroneous determination of the presence/absence of the control program such that the control object can not be controlled normally when only the data is present but the program has been erased. This problem may be countered by providing boot program logic for determining the presence/absence of the control program in more detail. However, the boot program (which will not be rewritten again in general) would then be made complicated and large sized. In addition, flexible counter measures can not be taken against the control program, which requires different determination logic for determining its presence or absence to cope with different constructions.

SUMMARY OF THE INVENTION

The present invention has been attained to solve the above problems and has an object to provide an electronic control apparatus, which has a control program for controlling a predetermined control object and a determination logic for determining its presence/absence in a rewritable nonvolatile memory and proceeds to execute the control program to control the control object only when the control program has been written.

According to an electronic control apparatus of the present invention, when it is determined by a determination program in a rewritable nonvolatile memory that a control program for controlling a predetermined object is to be executed, it is confirmed first that a check program is present in a predetermined address area in a storage area for storing the control program, and then the processing proceeds to the control program after an execution of the check program. The control program is executed actually only when the presence of the control program is confirmed by the check program beforehand. Thus, it will not occur that the processing jumps erroneously to the control program when the control program is not present, and an erroneous operation due to erroneous execution of the program can be restricted. Further, the check program for confirming the presence/absence of the control program is set in a predetermined address in the storage area of the control program. Thus, the address. of the data, which indicates the presence/absence of the control program, does not change even when the control program is altered and its size is changed. As a result, a determination program e a small one which is simple and does not require changes, thus providing flexibility against changes in the control program.

BRIEF DESCRIPTION OF THE DRAWINGS

Other objects, features and advantages of the present invention will become more apparent from the following detailed description made with reference to the accompanying drawings. In the drawings.

DETAILED DESCRIPTION OF THE PREFERRED EMBODIMENT

Figure 1:
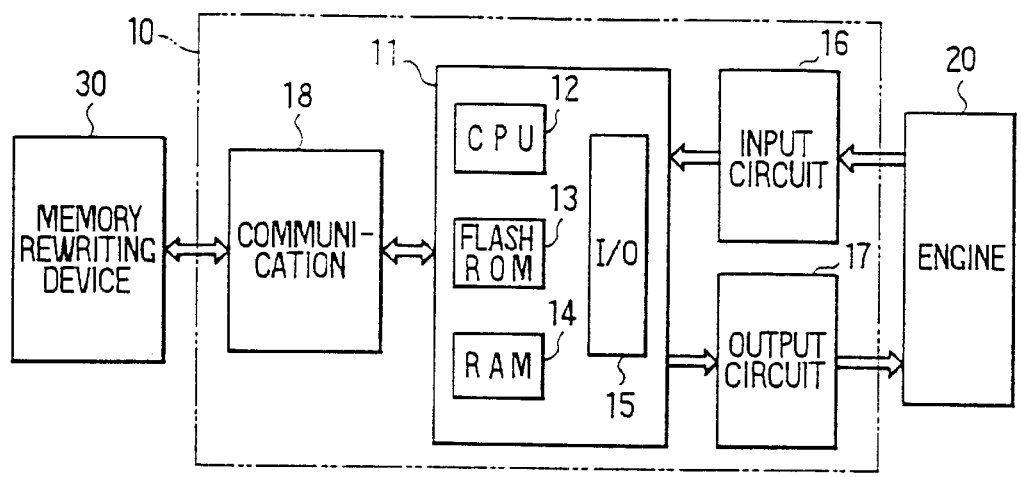
FIG. 1 is a block diagram showing an entire construction of an ECU, to which an electronic control apparatus according to one embodiment of the present invention is applied and which is mounted on a vehicle.

The present invention is described hereunder with reference to an embodiment shown in FIG. 1, which shows an entire construction of an electronic control apparatus for an internal combustion engine mounted on a vehicle.

In FIG. 1, numeral 10 designates an internal combustion engine electronic control apparatus (ECU). Sensor signals from various sensors (not shown) which sense operation conditions of an internal combustion engine 20 are applied to the ECU 10. The sensor signals from those sensors are applied to a microcomputer 11 after waveform-shaping, A/D conversion processing and the like by an input circuit 16 in the ECU 10. In the microcomputer 11, optimum control amounts of the internal combustion engine 20 are calculated based on the sensor signals from the input circuit 16, and control signals indicative of the calculation results are applied to an output circuit 17. Actuators of the internal combustion engine 20, such as an igniter, injectors (fuel injection valves) and the like which are not shown in the figure, are driven by the control signals from the output circuit 17. Various warning lights may be driven when needed. Further, the ECU 10 includes a communication circuit 18 for executing data communications with a memory rewriting device 30, which is connected when an internal combustion engine control program and data within the microcomputer 11 are to be rewritten.

The microcomputer 11 in the ECU 10 is constructed as a logic arithmetic circuit, which comprises a CPU 12 as a known central processing unit, a flash ROM 13 for storing therein programs and data, a RAM 14 for storing various data, an I/O (input/output) circuit 15 for receiving signals from the input circuit 16 and the communication circuit 18, etc. and producing the control signals to the output circuit 17, a bus line connecting those circuits, and the like. Here, the flash ROM 13 is a memory, that is, a rewritable nonvolatile memory, which is capable of erasing programs and data once written and writing programs and data again. An EEPROM or the like may also be used therefor.

A processing of initial setting by a boot program in the CPU 12 of the microcomputer in the ECU 10 used in the electronic control apparatus according to the embodiment of the present invention is described next with reference to a flow diagram shown in FIG. 2. This initial setting routine is executed repeatedly at every operation start of the CPU 12 in the microcomputer 11.

Figure 2:
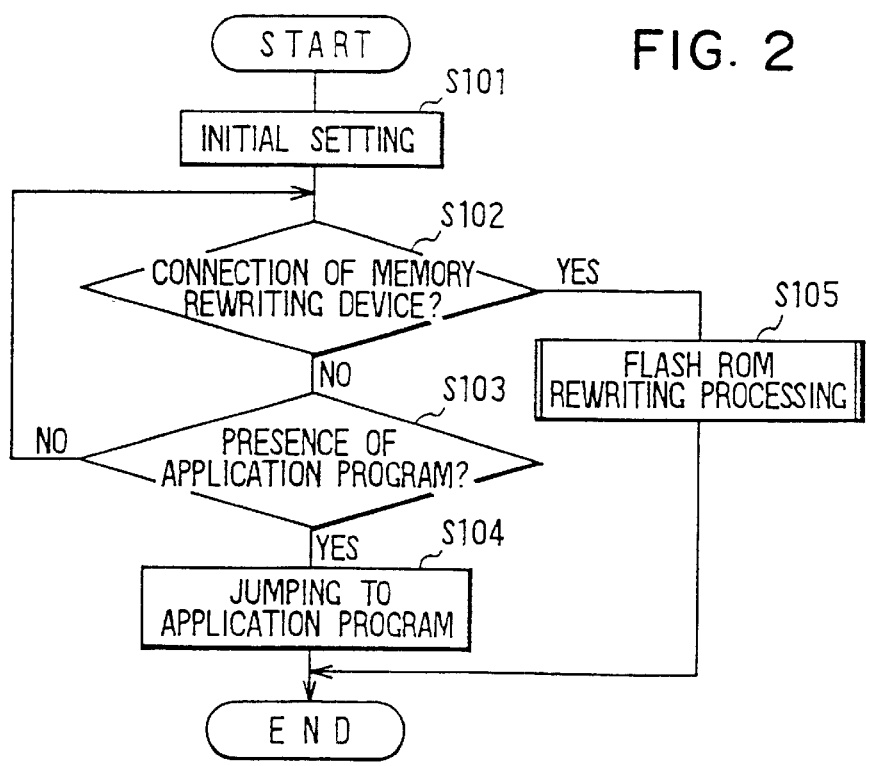
FIG. 2 is a flow diagram showing a processing of an initial setting in a CPU of a microcomputer used in the embodiment.

In FIG. 2, an initial setting is executed at step S101, and then the processing proceeds to step S102 to determine whether the memory rewriting device 30 is connected. The processing proceeds to step S103, if the determination result at step S102 is NO indicating that the memory rewriting device 30 is not connected. It is determined at step S103 whether an application program is present. The processing proceeds to step S104 to jump to the application program and end this routine, if the determination result at step S103 is YES indicating that the application program is present.

Here, if the processing jumps to the application program under the condition that the application program has not been written into the flash ROM 13, an erroneous operation will occur due to erroneous execution of the program because no application program is present. Therefore, the jumping to the application program is enabled only when the application program is present.

The processing returns to step S102 to wait in a loop condition for a connection of the memory rewriting device 30, which is for rewriting the application program, when the determination result at step S103 is NO indicating that the application program is not present. The processing proceeds to step S105 to execute a flash ROM rewriting processing on the flash ROM 13 in response to a program rewriting request if any, when the determination result at step S102 is YES indicating that the memory rewriting device 30 is connected.

Figure 3:
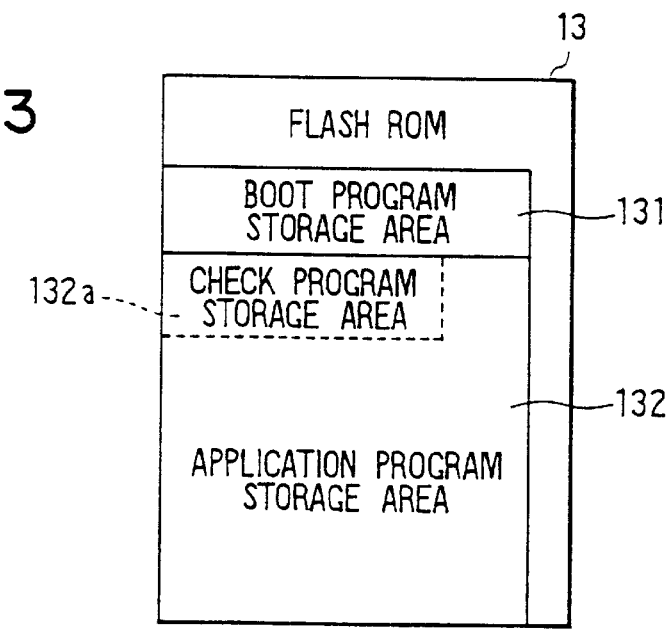
FIG. 3 is a block diagram showing an internal construction of a flash ROM used in the embodiment.

The internal construction of the flash ROM 13 used in this embodiment is shown in FIG. 3. That is, the flash ROM 13 has a boot program storage area 131 for storing the boot program, which reads out a flash ROM rewriting program from the memory rewriting device 30 and starts the flash ROM rewriting processing. The flash ROM 13 has an application program storage area 132 for storing the application program, which includes an internal combustion engine control program, data and the like. The flash ROM 13 further has at the head of the application program storage area 132 a check program storage area 132a for storing a check program, which is for checking the presence/absence of the application program. The storage areas 131, 132 and 132a are separated from each other in the flash ROM 13.

The head address of the check program storage area 132a is fixed, so that the check program stored in the check program storage area 132a may be accessed accurately from the boot program stored in the boot program storage area 131. As described hereunder, it is checked by this check program whether the application program is present and written normally, after confirming only the presence of the check program by the boot program. Thus, even when the format of the application program stored in the application program storage area 132 and the processing of checking its presence/absence is required to be changed, only the check program is required to be changed and the boot program is not required to be changed.

Figure 4:
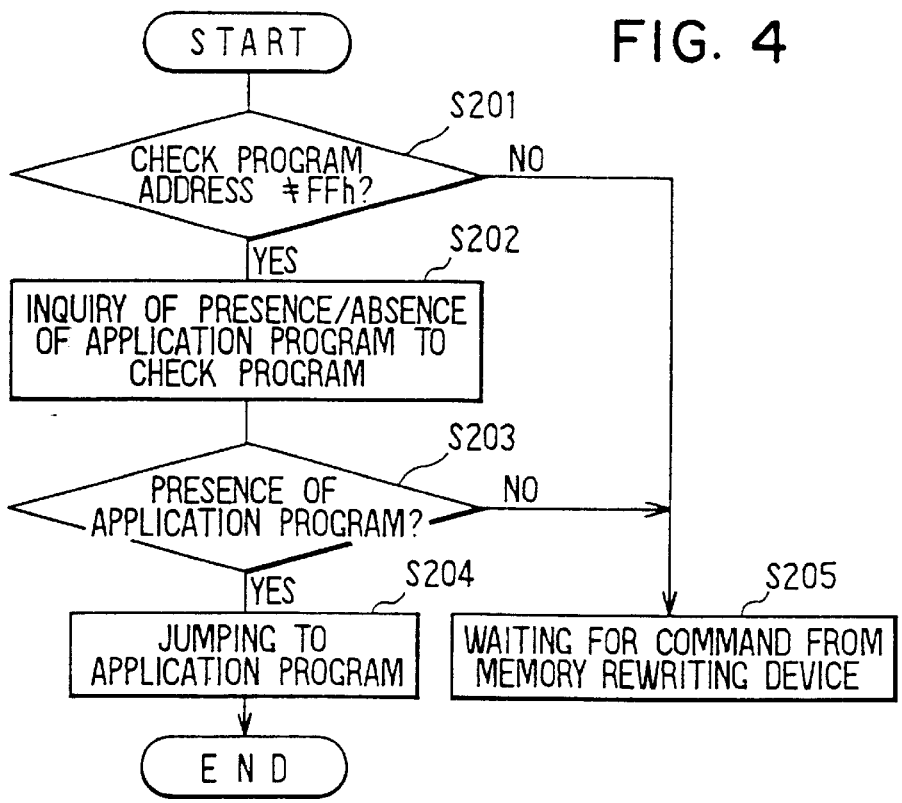
FIG. 4 is a flow diagram showing a processing of an application program presence/absence determination in the CPU of the microcomputer used in the embodiment.

The processing of determining the presence/absence of the application program by the boot program is shown in FIG. 4. This application program presence/absence determination routine is executed repeatedly by the CPU 12 in the microcomputer 11 at every initial setting.

It is determined at step S201 whether the head address, where the check program is stored, is not FFh and the check program itself for determining the presence/absence of the application program is present. Here, FFh (hexadecimal notation) means that all the 8 bits (1 byte) are 1 and corresponds to 255 (decimal notation). The presence/absence of the program can be determined by whether the head address of the program is FFh, because the cell content is generally FFh and the head address of the program does not become FFh, when the flash ROM 13 is in the erased condition.

The processing proceeds to step S202 to inquire the check program about the presence/absence of the application program, if the determination result at step S201 is YES indicating that the head address of the check program storage area 132a in the flash ROM 13 is not FFh and the check program is present. It is determined at step S203 by the inquiry to the check program at step S202 whether the application program is present. Here, the presence/absence of the application program can be determined by whether the predetermined address is a predetermined data, a check sum coincides with a predetermined value or the like. In this embodiment, the boot program need not be altered at all, because the check program is present in the application program and is alterable with the application program.

The processing proceeds to step S204 to jump to the application program and ends this routine, if the determination result at step S203 is YES indicating that the response from the check program is indicative of the presence of the application program. The processing proceeds to step S205 to be in a wait condition for a command from the memory rewriting device 30, if the determination result at step S201 is NO indicating that the head address of the check program is FFh and the check program is not present, or if the determination result at step S203 is NO indicating that the response from the check program is indicative of the absence of the application program.

Figure 5:
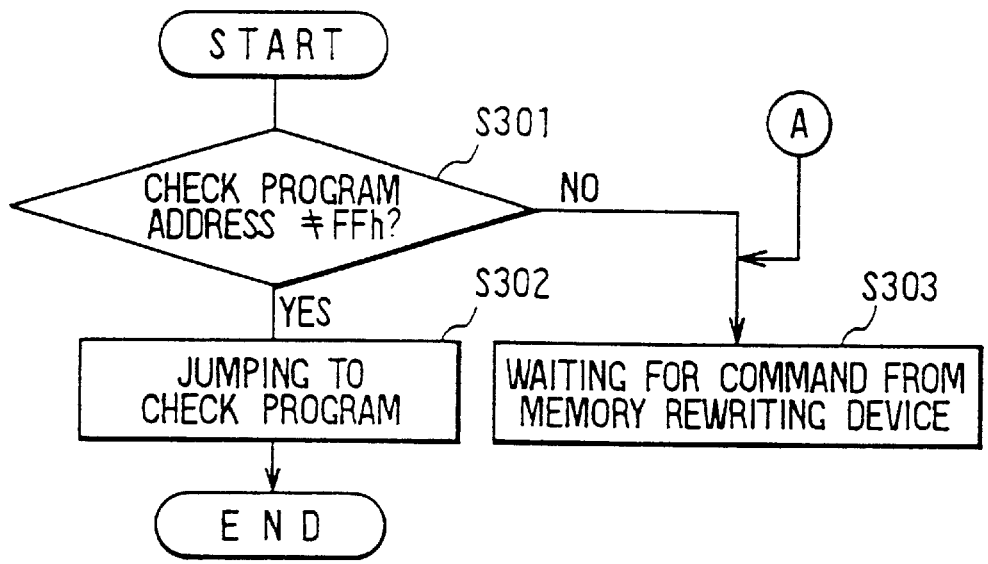
FIG. 5 is a flow diagram showing a modification of a processing of a check program presence/absence determination in the CPU of the microcomputer used in the embodiment.
Figure 6:
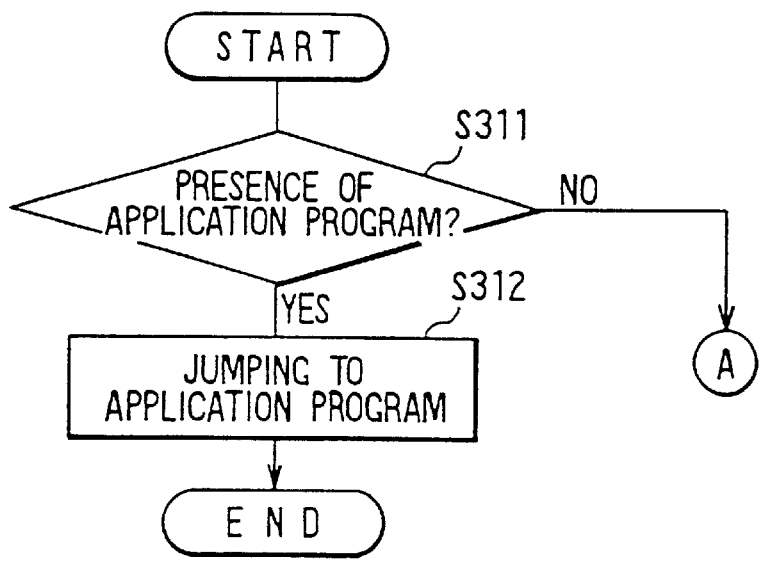
FIG. 6 is a flow diagram showing a modification of the processing of the application program presence/absence determination executed by a check program to which the processing shown in FIG. 5 jumps.

A modification of the processing of determining the presence/absence of the application program by the boot program is described next with reference to flow diagrams shown in FIGS. 5 and 6. Here, FIG. 5 is a flow diagram showing a processing of a check program presence/absence determination, and FIG. 6 is a flow diagram showing a processing of an application program presence/absence determination, this processing being executed by a check program to which the processing jumps in FIG. 5. This application program presence/absence determination routine is executed repeatedly by the CPU 12 in the microcomputer 11 at every initial setting.

In FIG. 5, it is determined at step S301 whether the head address of the check program is not FFh and the check program itself for determining the presence/absence of the application program is present. The processing proceeds to step S302 to jump to the check program because of presence of the check program and ends this routine, if the determination result at step S301 is YES indicating that the head address in the check program storage area 132a in the flash ROM 13 is not FFh and the check program is present.

The processing however proceeds to step S303 to stay in the wait condition for the command from the memory rewriting device 30, if the determination result at step S301 is NO indicating that the head address in the check program storage area 132a in the flash ROM 13 is FFh and the check program is not present.

The processing proceeds to step S311 in FIG. 6 as the check program processing to which the step S302 in FIG. 5 jumps, and determines whether the application program is present. Here, the presence/absence of the application program may be determined by whether the predetermined address is a predetermined data, a check sum coincides with a predetermined value or the like. In this embodiment also, the boot program need not be altered at all, because the check program is present in the application program and is alterable with the application program.

The processing proceeds to step S312 to jump to the application program and ends this routine, if the determination result at step s311 is YES indicating the presence of the application program. The processing however proceeds to step S303 in FIG. 5 to be in the wait condition for the command from the memory rewriting device 30, if the determination result at step S311 is NO indicating the absence of the application program.

As described above, the ECU 10 has the flash ROM 13 as the rewritable nonvolatile memory for storing in the boot program storage area 131 and the application program storage area 132, respectively, the application program as the control program for controlling the internal combustion engine 20 as the predetermined control object and the boot program as the determination program for determining whether the application program or the writing into the internal storage area is to be executed before the execution of the application program. The flash ROM 13 further stores in the check program storage area 132a, which is at the head address of the application program storage area 132, the check program for disabling a transition to the application program when the application program has not been written. The ECU 10 has a microcomputer 11 for executing the processing based on the application program, the boot program or the check program stored in the flash ROM 13. In this ECU 10, the microcomputer confirms the presence of the check program when it is determined by the boot program that the application program is to be executed, and proceeds to the application program after executing the check program.

Thus, when the microcomputer 11 determines by the boot program that the application program is to be executed as the control program, it is confirmed first that the check program is present in the check program storage area 132a, which is at the head address of the application program storage area 132, and then the processing proceeds to the application program after the execution of the check program. The application program is executed actually only when the presence of the application program is confirmed by the check program beforehand. Thus, it will not occur that the processing jumps erroneously to the application program when the application program is not present, and an erroneous operation due to erroneous execution of the program can be restricted. Further, the check program storage area 132a for storing the check program is set at the head address of the application program storage area 132 in which the application program is stored. Thus, the address of the data, which indicates the presence/absence of the application program, does not change even when the application program is altered and its size is changed. As a result, the boot program can be a small one which is simple and does not require changes, thus providing flexibility against changes in the application program.

Further, the microcomputer 11 holds a wait condition with the boot program in the flash ROM 13 when it is determined by the check program that the application program has not been written into the application program storage area 132 in the flash ROM 13. That is, the check program stored at the head address of the check program storage area 132a is executed, and the processing stops in the midst of the processing of the boot program to hold the wait condition until the memory rewriting device 30 is connected and the application program is written, when the application program has not been written into the application program storage area 132. Thus, the processing does not jump erroneously to the application program when the application program is not present, thus preventing erroneous operation caused by the erroneous execution of the program.

Still further, the microcomputer 11 proceeds to the application program, only when it is determined by the check program that the application program has been written into the application program storage area 132 and its result is confirmed by the boot program. That is, the check program at the head address of the check program storage area 132a is executed, and it is determined that the application program has been written into the application program storage area 132. The processing proceeds to the application program by the boot program only when the boot program confirms the writing. Thus, the internal combustion engine 20 can be controlled normally by jumping to the application program only when the processing of the check program confirms that the application program is present.

Still further, the microcomputer 11 proceeds directly to the application program, when it is determined by the check program that the application program has been written into the application program storage area 132. That is, the check program at the head address of the check program storage area 132a is executed, and the processing proceeds to the application program directly when it is determined that the application program has been written in the application program storage area 132. Thus, the internal combustion engine 20 can be controlled normally by the direct jumping of processing to the application program when the application program is determined to be present in the execution of the check program.

Still further, the flash ROM 13 stores all of the boot program, the application program and the check program, and stores the boot program and the application program and the check program in different storage areas. That is, the boot program, the application program and the check program are stored in the boot program storage area 131, the application program storage area 132 and the check program storage area 132a at the head address of the application program storage area 132 of the flash ROM 13, respectively. Thus, the size of the boot program storage area 131 for storing the boot program which is not required to be changed and the size of the check program storage area 132a for storing the check program can be fixed. The application program is not required to have the data to indicate its own presence/absence. As a result, the address construction can be altered freely, and the size of the application program can be altered freely.

The present invention should not be limited to the disclosed embodiment and modification, but may be implemented in many other ways without departing from the spirit of the invention.

What is claimed is:

1. An electronic control apparatus comprising:
   a rewritable nonvolatile memory for storing in respective first and second storage areas (a) a control program for controlling a predetermined control object and (b) a determination program for determining whether the control program is to be executed or re-written,
   the rewritable nonvolatile memory further storing in a predetermined address in the first storage area a check program for disabling transition to execution of the control program if the control program has not been written; and
   electronic control means for executing processes based on the control program, the determination program or the check program stored in the nonvolatile memory,
   wherein the electronic control means confirms presence of the check program when it is determined that the control program is to be executed, and proceeds to execute the control program after executing the check program, and
   wherein the first storage area and the second storage area are for programs that are and are not capable of being rewritten, respectively.

2. An electronic control apparatus as in claim 1, wherein the electronic control means executes a wait condition when it is determined by the check program that the control program has not been written into the first storage area of the nonvolatile memory.

3. An electronic control apparatus as in claim 1, wherein the electronic control means proceeds to execute the control program, only when it is determined by the check program that the control program has been written into the first storage area of the nonvolatile memory and its result is confirmed by the determination program.

4. An electronic control apparatus as in claim 2, wherein the electronic control means proceeds directly to execute the control program when it is determined by the check program that the control program has been written into the first storage area of the nonvolatile memory.

5. An electronic control apparatus as in claim 1, wherein the first storage area for storing the check program is located at a head of the first storage area for storing the control program.

6. An electronic control apparatus as in claim 5, wherein the address of the head of the first storage area is fixed, and the determination program determines only whether the content of the head of the predetermined storage area is a predetermined one.

7. An electronic control apparatus as in claim 6, wherein the check program checks whether the control program is present.

8. An electronic control apparatus as in claim 1, further comprising:
   a communication circuit for connecting the electronic control means and the nonvolatile memory to a memory rewriting device when the control program and the check program of the nonvolatile memory are to be rewritten.

9. An electronic control apparatus as in claim 1, wherein the control object is an internal combustion engine.

10. An electronic control apparatus as in claim 1, wherein the first storage area and the second storage area are separated from each other, and the determination program in the second storage area is incapable of being rewritten from a memory rewriting device.

11. An electronic control apparatus comprising:
    a rewritable nonvolatile memory having a first area storing a boot program that is not to be subsequently rewritten and a second area that is to be subsequently rewritten, said second area storing both (a) an application control program and (b) a check program for determining the presence of said application control program; and
    an electronic control processor which, upon start up, begins executing said boot program and, before executing said application control program, first executes said check program to confirm the presence of said application control program.

12. A method for organizing and maintaining a rewritable nonvolatile memory of an electronic control apparatus, said method comprising:
    storing a permanent boot program in a first area of the memory;
    storing a check program and a control application program in a second area of the memory, the check program being stored starting at a predetermined address and including executable instructions for determining whether a respectively corresponding control application program has been correctly and completely written into the memory; and
    upon external command, rewriting the second area of the memory including rewriting a new check program corresponding to a new control application program being rewritten there into.

13. An electronic control apparatus having a rewritable nonvolatile memory, said apparatus comprising:

means for storing a permanent boot program in a first area of the memory;

means for storing a check program and a control application program in a second area of the memory, the check program being stored starting at a predetermined address and including executable instructions for determining whether a respectively corresponding control application program has been correctly and completely written into the memory; and means for, upon external command, rewriting the second area of the memory including rewriting a new check program corresponding to a new control application program being rewritten there into.

* * * * *